US011167488B2

(12) United States Patent
Bruggeman et al.

(10) Patent No.: US 11,167,488 B2
(45) Date of Patent: Nov. 9, 2021

(54) SYSTEM FOR ADDITIVE MANUFACTURING

(71) Applicant: BOND HIGH PERFORMANCE 3D TECHNOLOGY B.V., Enschede (NL)

(72) Inventors: Thomas Jonathan Bruggeman, Enschede (NL); Adrianus Bruggeman, Enschede (NL); Kevin Hendrik Jozef Voss, Enschede (NL); Klaas Groen, Enschede (NL); Johannes Hermannus Timmer Arends, Enschede (NL); Martijn Johannes Wolbers, Enschede (NL); Koendert Hendrik Kuit, Enschede (NL); Marald Speelman, Enschede (NL)

(73) Assignee: BOND HIGH PERFORMANCE 3D TECHNOLOGY B.V., Enschede (NL)

( * ) Notice: Subject to any disclaimer, the term of this patent is extended or adjusted under 35 U.S.C. 154(b) by 17 days.

(21) Appl. No.: 17/050,096

(22) PCT Filed: Apr. 23, 2019

(86) PCT No.: PCT/EP2019/060304
§ 371 (c)(1),
(2) Date: Oct. 23, 2020

(87) PCT Pub. No.: WO2019/206868
PCT Pub. Date: Oct. 31, 2019

(65) Prior Publication Data
US 2021/0086446 A1    Mar. 25, 2021

(30) Foreign Application Priority Data

Apr. 23, 2018  (EP) .................................... 18168717

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/321* (2017.08); *B29C 64/393* (2017.08);
(Continued)

(58) Field of Classification Search
CPC ... B29C 64/209; B29C 64/321; B29C 64/393; B33Y 30/00; B33Y 40/00; B33Y 50/02
See application file for complete search history.

(56) References Cited

U.S. PATENT DOCUMENTS

2018/0326743 A1* 11/2018 Lee ........................ B41J 2/3354

FOREIGN PATENT DOCUMENTS

| CN | 103878980 B | 11/2015 |
|---|---|---|
| CN | 106493944 A | 3/2017 |

(Continued)

OTHER PUBLICATIONS

Luna Cui ("Automatic replacement nozzle video show", Youtube, Apr. 17, 2018 (Apr. 17, 2018), p. 1 pp., XP054978773, Retrieved from the Internet: URL:https://www.youtube.com/watch?v=b69qJjj_-gA [retrieved on Oct. 11, 2018]) (Year: 2018).*
Steven Yoshida ("Testing automatic nozzle change on DIY PNP", Youtube, Feb. 4, 2015 (Feb. 4, 2015), p. 1 pp., XP054978772, Retrieved from the Internet: URL:https://www.youtube.com/watch?time_continue=2&v=PEghwdOIDTA [retrieved on Oct. 11, 2018]) (Year: 2015).*

(Continued)

*Primary Examiner* — Yung-Sheng M Tsui
(74) *Attorney, Agent, or Firm* — Hudak, Shunk & Farine Co. LPA

(57) ABSTRACT

A system for additive manufacturing, having at least one printhead assembly that includes a feedstock liquefying unit for liquefying and depositing feedstock material via a nozzle, heat exchanging elements attached to the printhead assembly being provided with a receiving space that is configured and arranged to receive the feedstock liquefying unit, and a connection arrangement that includes a first connecting element and a second connecting element that are configured and arranged to one of establish a releasable connection with each other and disconnect the releasable (Continued)

connection upon rotating the first and second connecting elements with respect to each other. The system further including a feedstock liquefying unit storage, having an actuating device that enables assembling and disassembling the connecting arrangement to automatically exchange the feedstock liquefying unit, and a controller for controlling automatic exchange of the feedstock liquefying unit.

20 Claims, 9 Drawing Sheets

(51) Int. Cl.
  *B33Y 40/00* (2020.01)
  *B33Y 50/02* (2015.01)
  *B29C 64/321* (2017.01)
  *B29C 64/393* (2017.01)
(52) U.S. Cl.
  CPC ............... *B33Y 30/00* (2014.12); *B33Y 40/00* (2014.12); *B33Y 50/02* (2014.12)

(56) References Cited

FOREIGN PATENT DOCUMENTS

| | | |
|---|---|---|
| CN | 206579134 U | 10/2017 |
| DE | 102015012706 A1 * | 4/2017 ........... B29C 64/118 |
| JP | 2016518267 A | 6/2016 |

OTHER PUBLICATIONS

Yoshida, S., Testing automatic nozzle change of DIY PNP, Youtube, Feb. 4, 2015, p. 1, XP054978772, url:https://www.youtube.com/watch?time_continue=2&v=PEghwd01DTA.

Cui, L., Automatic replacement nozzle video show, Youtube, Apr. 17, 2018, p. 1, XP054978773, URL:https://www.youtube.com/watch?v=b69qJjj_-gA.

Chinese Office Action dated Mar. 30, 2021 for family member Application No. 201980027858.8.

Japanese Office Action dated Apr. 27, 2021 for family member Application No. 2020558889.

* cited by examiner

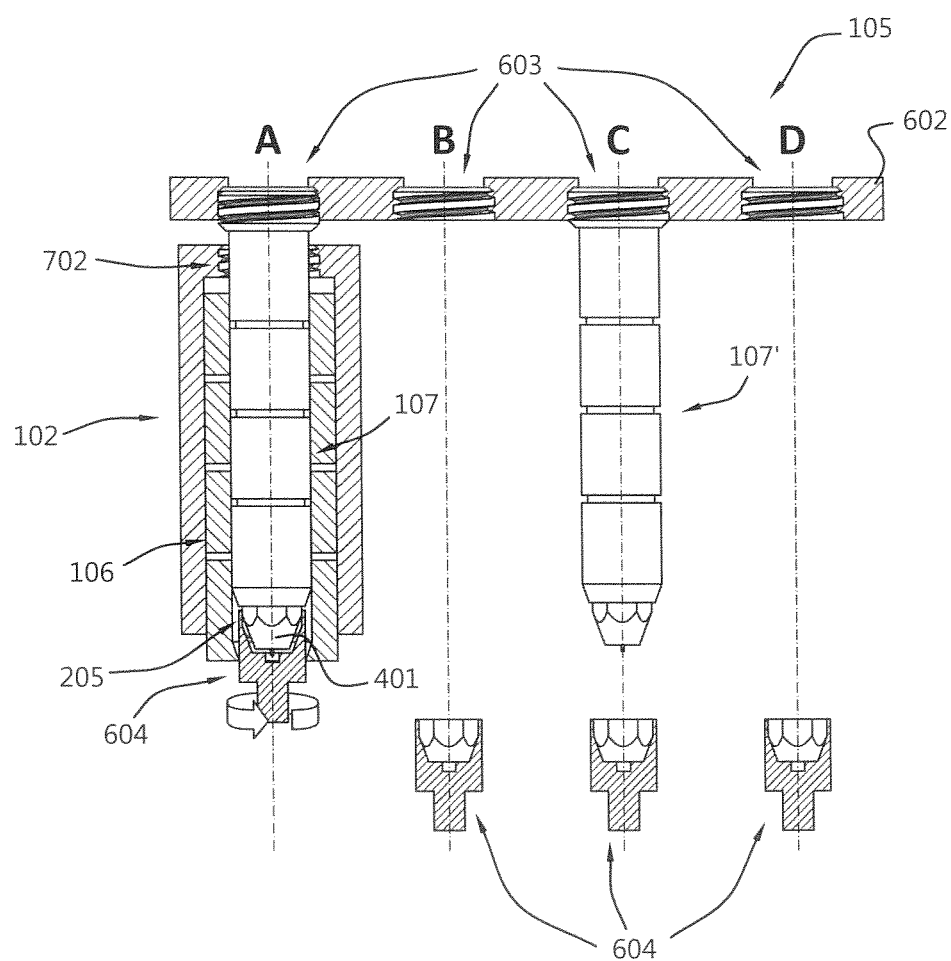

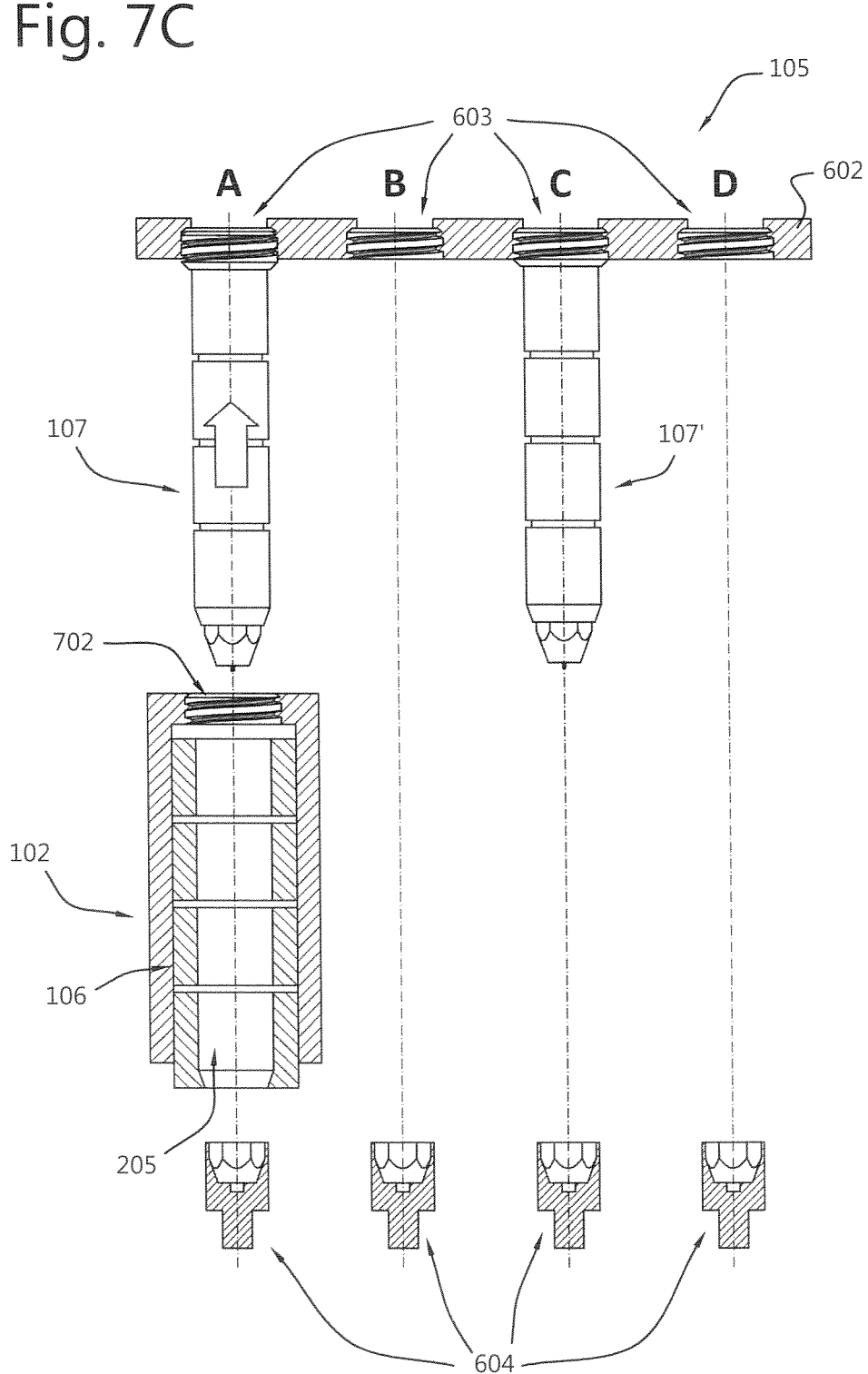

SYSTEM FOR ADDITIVE MANUFACTURING

FIELD OF THE INVENTION

The present invention relates to a system for additive manufacturing (AM) of a three-dimensional (3D) object using 3D printing. More specifically the invention relates to replacement of a feedstock liquefying unit in such a system.

BACKGROUND OF THE INVENTION

In three-dimensional modeling, objects are formed by layering modeling material in a controlled manner such that a desired three dimensionally shaped object can be created. This way of forming objects can also be referred to as additive manufacturing (AM). Very often for three-dimensional modeling a three-dimensional modeling printer is used. The printer has a three dimensionally moveable printhead which dispenses the modeling material, while the printhead is moved over previously deposited tracks of the modeling material.

The object to be printed can be placed on a build plate. The printhead is movable in a three dimensional space relative to the object being modeled or printed. In some cases, the object is movable in one or more dimensions relative to the printhead. Various options are available for moving the build plate on which the object is modeled and the printhead relative to each other.

The motions of the printhead are controlled by a control system which controls a controllable positioning system to which the printhead is attached. By means of software a pattern of tracks can be generated, which pattern is used for moving the printhead and for depositing the tracks.

The 3D object is created on a build plate in a reference location relative to the movable printhead. The modeling material can be fused with previously formed tracks. The modeling material can be fed in the printhead in the form of for example filament, granulate, rod, liquid, resin or a suspension.

The modeling material, hereinafter also referred to as AM feedstock material, is dispensed from the printhead through a feedstock liquefying unit and is deposited on the build plate in the form of tracks forming a layer of tracks, or when a previous layer of the object to be created has been deposited, on previously deposited tracks where it is allowed to solidify. The modeling material can be thermally or chemically or otherwise fused with the previously deposited tracks. The modeling material can be dispensed from the printhead and deposited on the previously deposited tracks and cured to solidify after the deposition.

The relative motion of the build plate and object to the printhead along tracks and simultaneous deposition of modeling material from the printhead allow the fused deposition modeled object to grow with each deposited track and gradually attains its desired shape.

The modeling material within the feed channel of the printhead may decay while printing. This may be due to for example impurities within the modeling material, or ingress of dust or other particles from the environment wherein the three-dimensional printer is located, or other sources. For fusible material which is melted prior to deposition by the feedstock liquefying unit of a printhead, in order for it to be printable, there is a risk of decomposition or disintegration if the material is kept at a high temperature near the melting temperature too long.

This may give rise to formation of solid particles of disintegrated modeling material. In depositing for example curable resins, also contaminants within the modeling material, and/or dead spots within the feed channel may eventually give rise to formation of solid particles. This applies especially for the feedstock liquefying unit which is usually kept at the highest temperature within the printhead. Near the feed channel wall, especially near the feedstock liquefying unit, the modeling material flow rate is lowest. As a consequence, undesired solidification and disintegration is usually initiated in this region.

While depositing the modeling material, debris or solid particles in the feed channel or nozzle of the feedstock liquefying unit may cause clogging and can lead to reflow of material inside the feedstock liquefying unit, causing jamming of the feedstock liquefying unit.

Alternatively, the nozzle opening of the feedstock liquefying unit can wear out and dilate, resulting in a larger width of printed tracks and less accurate part dimensions. Moreover, the pressure of the extruded material from the nozzle will be higher, potentially resulting in over-extrusion of the layer being deposited on the previous layer. This may result in excessive forces between the object and the printhead and in a rough surface of the created object due to overflow of the modeling material. The overflow of modeling material may further lead to debris or residue on the outside of the nozzle tip of the printhead which may come off the nozzle tip and fuse with the object being printed and cause potential loss of the object.

Furthermore, when printing objects, different colors or different materials may be used. Moreover different feedstock deposition modeling methods may apply, involving for example different nozzle diameters or different feedstock supply tubes for different materials depending on the requirements in time.

Thus it is desirable to exchange the feedstock liquefying unit depending on the feedstock deposition modeling requirements for maintenance, material choice, feedstock deposition method etcetera.

In the art feedstock liquefying units have been integrated with the heat exchanging means to provide heat transfer between heating elements of the heat exchanging means. This is necessary to prevent hotspots within the feedstock liquefying unit. To exchange the feedstock liquefying unit, the entire printhead including heat exchanging means and feedstock liquefying unit needs to be exchanged. As the heat exchanging means is usually powered electrically, specialized electrical connections are required to connect the heat exchanging means of the exchanged printhead.

Alternatively, the nozzle or nozzle tip of the feedstock liquefying unit can be exchangeable. In the art this requires manual intervention such as unscrewing a current feedstock liquefying unit to be exchanged from the printhead, and screwing in a replacement feedstock liquefying unit or nozzle or nozzle tip into the printhead. This procedure however causes interruption of the 3D modeling process wherein the printhead needs to be cooled down. The interruption and subsequent cooling down may lead to abortion of an ongoing modeling job and subsequent loss of resources and time.

Exchanged or spare printheads can be stored in a printhead holder. As printheads may be bulky, considerably large sized and relatively expensive holders or cassettes are needed for storing the printheads.

Consequently, there is a need to provide a system for additive manufacturing that allows for an improved exchange of the feedstock liquefying unit.

SUMMARY OF THE INVENTION

It is an object of the present invention to provide a system for additive manufacturing that pre-empts or at least reduces at least one of the abovementioned and/or other disadvantages associated with exchange of feedstock liquefying units in systems for additive manufacturing known in the art.

Aspects of the present invention are set out in the accompanying independent and dependent claims. Features from the dependent claims may be combined with features from the independent claim as appropriate and not merely as explicitly set out in the claims.

At least one of the abovementioned objects is achieved by a system for additive manufacturing. The system comprising a build plate for positioning a three-dimensional (3D) object to be fabricated and at least one printhead assembly for fused deposition modeling. The printhead assembly comprising connection means that is configured and arranged to connect the printhead assembly to a positioning system, a feedstock liquefying unit for liquefying AM feedstock material, comprising a nozzle for depositing the liquefied AM feedstock material onto at least one of the build plate and the 3D object to be fabricated, heat exchanging means that is attached to the printhead assembly and that is provided with a receiving space that is configured and arranged to receive and accommodate the feedstock liquefying unit to allow heat exchange between the heat exchanging means and the feedstock liquefying unit, and a connection arrangement that comprises a first connecting element and a second connecting element that are configured and arranged to one of establish a releasable connection with each other upon assembling the connection arrangement to releasably accommodate the feedstock liquefying unit within the receiving space after inserting the feedstock liquefying unit therein, and disconnect said releasable connection upon disassembling the connection arrangement to remove the feedstock liquefying unit from the receiving space.

The system further comprising feedstock supply means that is configured and arranged to feed the AM feedstock material into the feedstock liquefying unit, a positioning system associated with at least one of the printhead assembly and the build plate, that is configured and arranged to spatially position the printhead assembly and the build plate relative with respect to each other, a feedstock liquefying unit storage, comprising an actuating means that is configured and arranged to enable assembling and disassembling the connecting arrangement to automatically exchange the feedstock liquefying unit, and a controller that is configured and arranged to control at least one of the positioning system and the actuating means to one of automatically dispose a used feedstock liquefying unit in the feedstock liquefying unit storage and automatically acquire a replacement feedstock liquefying unit from the feedstock liquefying unit storage.

By establishing and disconnecting the releasable connection between the first connecting element and the second connecting element of the connection arrangement, exchange of the feedstock liquefying unit can be automated in an effective and simplified way. The person skilled in the art will appreciate that a used feedstock liquefying unit can be replaced by a feedstock liquefying unit stored within the feedstock liquefying unit storage, while keeping the heat exchanging means in place, i.e. within the printhead assembly. Furthermore, the heat exchanging means remains unchanged during the exchange of the feedstock liquefying unit, i.e. it does not need to be adjusted for example by at least partially being opened to allow for the exchange. Moreover, the heat exchanging means stays connected to its energy source that is configured and arranged to heat the feedstock liquefying unit. Hence, exchanging the feedstock liquefying unit can be done in a more reliably and faster way.

The person skilled in the art will appreciate that a currently used feedstock liquefying unit may be replaced by another feedstock liquefying unit having the same or different feedstock material. The replacement feedstock liquefying unit may further have different properties such as nozzle diameter. However, the outer shape profile and dimensions of the replacement feedstock liquefying unit must correspond to the inner shape profile of the receiving space of the heat exchanging means in which the feedstock liquefying unit is to be accommodated tight fittingly to ensure adequate heat exchange between the heat exchanging means and the feedstock liquefying unit.

In an embodiment of the system according to the invention, the connection arrangement is configured and arranged to establish the releasable connection between the first connecting element and the second connecting element in one of a force fitting way and a form fitting way.

Regarding force fitting connections, the person skilled in the art will appreciate that this kind of connections requires a normal force on the surfaces of the first connecting element and the second connecting element for them to be joined together. The mutual displacement of the first connecting element and the second connecting element is prevented, as long as the counter-force caused by the static friction is not exceeded. The force or friction is lost and the surfaces slip on each other when the tangentially or axially acting load force is greater than the static friction force. Examples of force fitting connections are clamping connections and screw connections.

Regarding form fitting connections, the person skilled in the art will appreciate that this kind of connections are created by the interaction of at least two connecting elements. As a result, the first connecting element cannot be disconnected whether or not they are subjected to a force, i.e. in the case of a form fitting connection the first connecting element of the at least two connecting elements gets in the way of the second connecting element. Form fitting connections can be established by pin-like connecting elements such as rivets and screws. It is noted that screw connections generally are considered as both force fitting connections and form fitting connections.

In an embodiment of the system according to the invention, the connection arrangement is configured and arranged to establish the releasable connection between the first connecting element and the second connecting element upon rotatably assembling the connection arrangement, or disconnect the releasable connection between the first connecting element and the second connecting element upon rotatably disassembling the connection arrangement. In this way an easy exchange of the feedstock liquefying unit in a direction transverse to the build plate can be achieved.

In an embodiment of the system according to the invention, the first connecting element and the second connecting element are respectively a first part and a second part of one of a screw thread connection, a bayonet connection, a machine taper connection and a collet connection. The person skilled in the art will appreciate that the aforementioned kinds of connections can be assembled and disassembled in a translatable and/or rotatable way and enable automatic exchange of the feedstock liquefying unit in an effective and simplified way.

In an embodiment of the system according to the invention, the feedstock supply means comprises a feed channel that is configured and arranged to accommodate and feed the AM feedstock material towards the feedstock liquefying unit that is provided with a receiving opening that is configured and arranged to receive the AM feedstock material from the feed channel and guide the feedstock material into a supply channel of the feedstock liquefying unit that is configured and arranged to supply the AM feedstock material from the receiving opening to the nozzle.

In this way, AM feedstock material is fed from the feed channel of the feedstock supply means into the supply channel of the feedstock liquefying unit. The heat exchanging means are configured and arranged to enable heat exchange with feedstock liquefying unit to enable one of melt and solidification of the AM feedstock material in the supply channel.

In an embodiment of the system according to the invention, the heat exchanging means comprises a first heat exchanging section that comprises a first heat exchanging zone, the first heat exchanging section being configured and arranged to at least partially enclose the receiving space that is configured and arranged to at least partially accommodate the supply channel of the feedstock liquefying unit, the first heat exchanging zone being configured and arranged to liquefy the AM feedstock material that is accommodated in the supply channel. The liquefied AM feedstock material can be deposited via the nozzle on top of either the build plate or previously deposited AM feedstock material.

In an embodiment of the system according to the invention, the first heat exchanging section comprises a second heat exchanging zone that is configured and arranged to maintain a boundary between solid AM feedstock material and liquefied AM feedstock material at a predetermined fixed position in the supply channel of the feedstock liquefying unit.

The person skilled in the art will appreciate that application of the second heat exchanging zone enables enhanced control over the deposition process as being able to maintain said boundary at a predetermined fixed position, despite changes in deposition rate, prevents feedstock material from getting stuck to the wall of the supply channel and thereby clogging the feedstock liquefying unit.

In an embodiment of the system according to the invention, the heat exchanging means comprises a second heat exchanging section that comprises a third heat exchanging zone, the second heat exchanging section being configured and arranged to at least partially accommodate the feed channel of the feedstock supply means and the third heat exchanging zone being configured and arranged to pre-heat the AM feedstock material that is accommodated in the feed channel. Pre-heating of the AM feedstock material in the feed channel enables improvement of the speed of the deposition process.

In an embodiment of the system according to the invention, the feedstock liquefying unit storage comprises holding means that is provided with at least one of at least one unoccupied docking position that is configured and arranged to receive and accommodate a used feedstock liquefying unit, and at least one occupied docking position that is configured and arranged to accommodate a replacement feedstock liquefying unit. This enables exchange of a used feedstock liquefying unit that is disposed in the feedstock liquefying unit storage with a replacement feedstock liquefying unit that is acquired from the feedstock liquefying unit storage to be accommodated in the receiving space of the heat exchanging means.

In an embodiment of the system according to the invention, the controller is configured to control the positioning system for moving the printhead assembly to the at least one unoccupied docking position of the holding means, enable engagement of the holding means and the used feedstock liquefying unit, enable engagement of the actuating means with at least one of the connecting arrangement, the feedstock liquefying unit and the heat exchanging means to disassemble the connection arrangement and dispose the used feedstock liquefying unit in the at least one unoccupied docking position of the holding means. In this way a feedstock liquefying unit that for example needs maintenance can automatically be removed from the printhead assembly, i.e. from the heat exchanging means without having to abort the print job. This feedstock liquefying unit is disposed in the at least one unoccupied docking position of the holding means of the feedstock liquefying unit storage.

In an embodiment of the system according to the invention, the controller is configured to control the positioning system for moving the printhead to the at least one occupied docking position of the holding means that is provided with a replacement feedstock liquefying unit, enable engagement of the replacement feedstock liquefying unit with the heat exchanging means, enable engagement of the actuating means with at least one of the connecting arrangement, the feedstock liquefying unit and the heat exchanging means to assemble the connection arrangement and accommodate the replacement feedstock liquefying unit within the receiving space of the heat exchanging means, and control the positioning system for retracting the printhead from the at least one occupied docking position of the holding means. This allows a replacement feedstock liquefying unit to be automatically collected and accommodated within the receiving space of the heat exchanging means.

In an embodiment of the system according to the invention, the actuating means comprises an engagement arrangement that is configured and arranged to engage with at least one of the connecting arrangement, the feedstock liquefying unit and the heat exchanging means in one of a form fitted way and a force fitted way to enable one of assembling and disassembling of the connecting arrangement to automatically exchange the feedstock liquefying unit. The engagement arrangement can comprise a wrench that has one of a polygonal shape with an arbitrary number of sides, a star shape with an arbitrary number of sides, an arbitrary number of pins, and an arbitrary number of recesses, e.g. through holes or blind holes, that enable providing a torque and/or axial force to rotate and/or translate at least one of the connecting arrangement, the feedstock liquefying unit and the heat exchanging means. The engagement arrangement can also comprise a clamp that is configured to exert a torque to at least one of the connecting arrangement, the feedstock liquefying unit and the heat exchanging means. The exerted torque is due to at least one of friction between the clamp and at least one of the connecting arrangement, the feedstock liquefying unit and the heat exchanging means and an interlocking or form fitting shape of the clamp and at least one of the connecting arrangement, the feedstock liquefying unit and the heat exchanging means.

In an embodiment of the system according to the invention, the connection arrangement is configured and arranged to enable release and acquisition of the feedstock liquefying unit in a direction parallel to an axial center line of the receiving space.

In an embodiment of the system according to the invention, the feedstock liquefying unit comprises a thermally conductive tube attached to the nozzle, wherein the supply channel is accommodated within the thermally conductive tube, and the receiving opening is formed by an end part of the thermally conductive tube that is arranged opposite the nozzle. This allows improved heat transfer between the heat exchanging means and the AM feedstock material accommodated in the supply channel.

In an embodiment of the system according to the invention, the thermally conductive tube is provided with at least one concentric heat conductive section, and wherein at least the first heat exchanging section is provided with at least one heat conductive element that is configured and arranged to accommodate the at least one concentric heat conductive section for close fittingly accommodating the feedstock liquefying unit inside at least the first heat exchanging section. Heat conductive sections of the feedstock liquefying unit can be interspersed with grooves, and heat conductive elements of the heat exchanging sections can be mutually thermally insulated. This allows temperature zones to be created each having an independently controllable temperature. Each temperature zone having an optimal heat transfer between the heat exchanging means and the feedstock liquefying unit, wherein the heat conductive sections ensure a uniform distribution of the heat from the heat exchanging sections, while thermal crosstalk is prevented between at least one of the heat conductive elements, the heat conductive sections and the heat exchanging sections of different temperature zones. In this way AM feedstock material within the feedstock liquefying unit can be heated in stages.

BRIEF DESCRIPTION OF THE DRAWINGS

Further features and advantages of the invention will become apparent from the description of the invention by way of exemplary and non-limiting embodiments of a system for additive manufacturing according to the invention.

The person skilled in the art will appreciate that the described embodiments of the system for additive manufacturing are exemplary in nature only and not to be construed as limiting the scope of protection in any way. The person skilled in the art will realize that alternatives and equivalent embodiments of the system for additive manufacturing can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

FIGS. 7A-7F schematically show an exemplary process for disposing a used feedstock liquefying unit in a feedstock liquefying unit storage according to the first exemplary, non-limiting embodiment thereof shown in FIG. 5 and acquiring a replacement feedstock liquefying unit from the feedstock liquefying unit storage using actuating means according to a sixth exemplary, non-limiting embodiment thereof.

DETAILED DESCRIPTION OF EMBODIMENTS

The invention will be further elucidated in exemplary embodiments thereof as described below.

Figure 1:
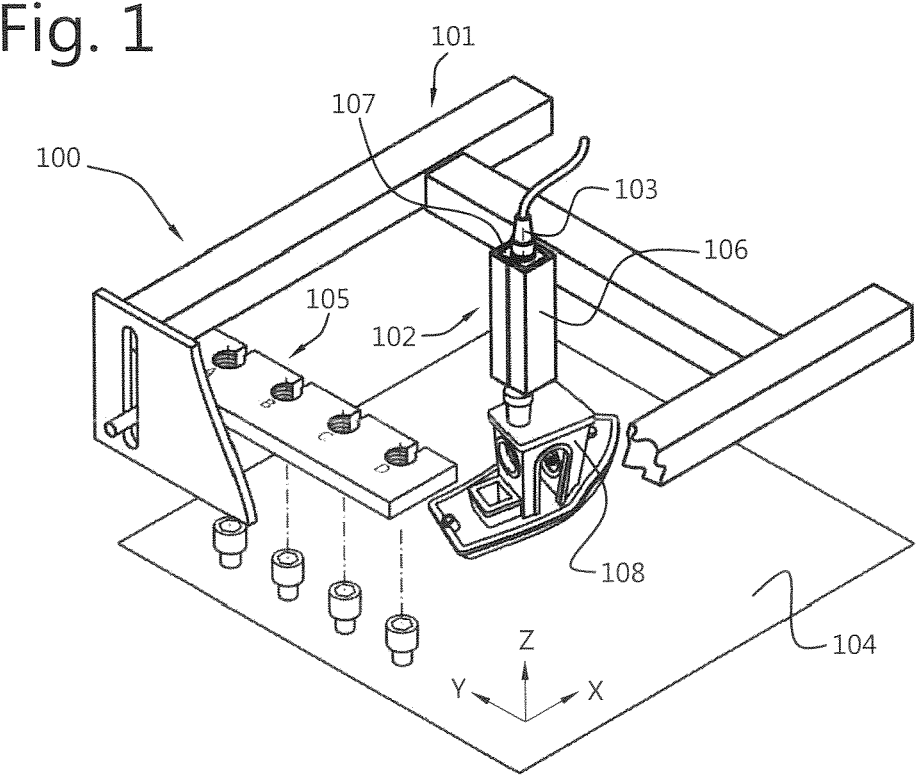
FIG. 1 shows a schematic isometric view of a first exemplary, non-limiting embodiment of a system for additive manufacturing according to the invention.

FIG. 1 shows a schematic isometric view of a first exemplary, non-limiting embodiment of a system 100 for additive manufacturing according to the invention. The system 100 comprises a build plate 104 that supports a three-dimensional (3D) object 108 to be created. The system 100 furthermore comprises a positioning system 101, shown as a gantry, that has a printhead assembly 102 attached thereon. Various alternatives may be envisioned for the positioning system 101 which is arranged to provide horizontal (X-Y) movement and vertical (Z) movement of the printhead assembly 102 relative to the build plate 104 and to the 3D object 108 to be created. In alternative embodiments, the 3D object 108 and/or the build plate 104 may be moved relative to the printhead 102. In another alternative embodiment both the printhead assembly 102 and the 3D object 108 and/or the build plate 104 may be moved relative to one another. The person skilled in the art will appreciate that the degrees of freedom of the relative movements are not confined to any number.

The positioning system 101 can be provided with drives that are controllable by a control system which can be arranged for translating an electronic 3D model of the 3D object 108 to be created into instructions for movements of the printhead assembly 102.

The printhead assembly 102 is provided with a feedstock liquefying unit 107 which obtains additive manufacturing (AM) feedstock material from a feedstock supply 103. The feedstock liquefying unit 107 is removably placed within a heat exchanging means 106 to allow the feedstock liquefying unit 107 to be removed and replaced by a replacement feedstock liquefying unit. In most cases, the heat exchanging means 106 is arranged to transfer heat to the feedstock liquefying unit 107 which allows AM feedstock material within the feedstock liquefying unit 107 to be melted. The heat exchanging means 106 may further be arranged to transfer heat away from the feedstock liquefying unit 107 in order to at least partially cool the feedstock liquefying unit 107. The heat exchanging means 106 may further be subdivided in heat exchanging sections that comprise heat exchanging zones. This will be further described in relation to FIGS. 2A-2D. In this way, heat exchange between the heat exchanging means 106 and the AM feedstock material within the feedstock liquefying unit 107 can be established in stages. For example, one or more zones of the heat exchanging means 106 may be arranged to cool a corresponding part of the feedstock liquefying unit 107 whereas other zones are arranged to heat another corresponding part of the feedstock liquefying unit 107.

The AM feedstock material is pushed by a drive (not shown in FIG. 1) into the feedstock liquefying unit 107. The drive is controllable by a control unit to allow a controlled flow of molten feedstock material in coordination with the printhead movements relative to the 3D object 108.

The pressure exerted on the feedstock material by the drive allows the molten feedstock material to be deposited via an exit opening, i.e. nozzle of the feedstock liquefying unit 107 on at least one of the build plate 104 and the 3D object 108 to be created, where it is cooled down and where it solidifies.

The feedstock liquefying unit 107 may be deposited in a feedstock liquefier unit storage 105. A previously stored replacement feedstock liquefying unit 107 may be retrieved from the feedstock liquefier unit storage 105.

Figure 2A:
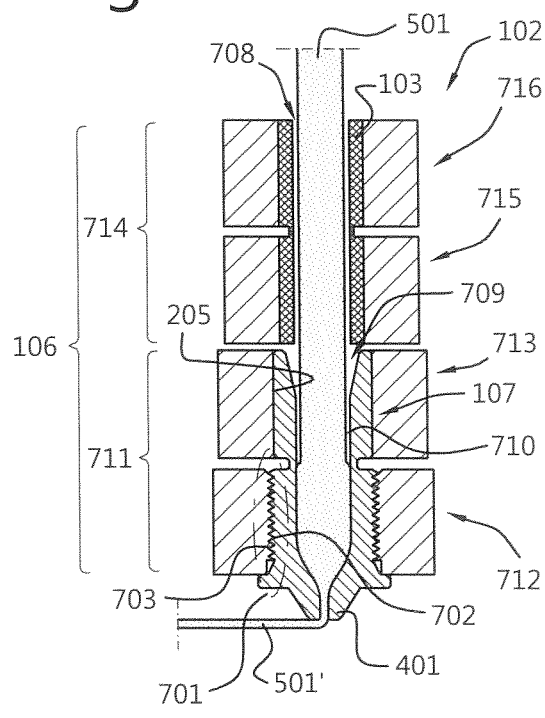
FIG. 2A shows a schematic longitudinal sectional view of a first exemplary, non-limiting embodiment of a connection arrangement of a printhead assembly of a system according to the invention.

FIG. 2A shows a schematic longitudinal sectional view of a first exemplary, non-limiting embodiment of a connection arrangement 701 of a printhead assembly 102 of a system 100 according to the invention. The heat exchanging means 106 comprises a first heat exchanging section 711 that is configured and arranged to at least partially enclose a receiving space 205 that is configured and arranged to at least partially accommodate the supply channel 710 of the feedstock liquefying unit 107 to allow heat exchange between the heat exchanging means 106 and the feedstock liquefying unit 107. The first heat exchanging section 711 comprises a first heat exchanging zone 712 that is configured and arranged to liquefy the AM feedstock material 501 that is accommodated in the supply channel 710. The liquefied AM feedstock material 501' can be deposited via the nozzle 401 of the feedstock liquefying unit 107 on top of either the build plate 104 or previously deposited AM feedstock material.

The first heat exchanging section 711 also comprises a second heat exchanging zone 713 that is configured and arranged to maintain a boundary between solid AM feedstock material and liquefied AM feedstock material at a predetermined fixed position in the supply channel 710 of the feedstock liquefying unit 107. The person skilled in the art will appreciate that application of the second heat exchanging zone 713 enables enhanced control over the deposition process as being able to maintain said boundary at a predetermined fixed position, despite changes in deposition rate, prevents feedstock material from getting stuck to the wall of the supply channel and thereby clogging the feedstock liquefying unit. Furthermore, an increased deposition rate can be achieved by pre-heating of the feedstock material.

FIG. 2A shows that the heat exchanging means 106 also comprises a second heat exchanging section 714 that is configured and arranged to at least partially accommodate a feed channel 708 of the feedstock supply means 103. The feed channel 708 is configured and arranged to accommodate and feed the AM feedstock material 501 towards a receiving opening 709 of the feedstock liquefying unit 107. The receiving opening 709 is configured and arranged to receive the AM feedstock material 501 from the feed channel 708 and guide the feedstock material into the supply channel 710 of the feedstock liquefying unit 107.

The second heat exchanging section 714 comprises a third heat exchanging zone 715 and a fourth heat exchanging zone 716. At least the third heat exchanging zone 715 can be configured and arranged to pre-heat the AM feedstock material 501 that is accommodated in the feed channel 708. The person skilled in the art will appreciate that pre-heating of the AM feedstock material 501 in the feed channel 708 enables improvement of the speed of the deposition process.

The person skilled in the art will appreciate that at least one of the first heat exchanging section 711 and the second heat exchanging section 714 may be provided with at least one of a heat supply and a heat sink for supplying or sinking heat to and from the liquefying unit 107. The heat supply may for example be an electrical resistor. The heat sink may for example be provided by a cooling fluid supply which may be admitted to the heat controlling section by means of a fluid channel. The cooling fluid may be a cold gas, e.g. cold air, or a cold liquid. At least one of the first heat exchanging section 711 and the second heat exchanging section 714 may further be provided with a temperature sensor connected to the control unit for controlling a temperature of the liquefying unit 107.

Furthermore, the first heat exchanging zone 712 and the second heat exchanging zone 713 may be electrically heated using electrical resistors incorporated within the first heat exchanging section 711 in order to melt the AM feedstock material that is fed from the feed channel 708 of the feedstock supply means 103 into the supply channel 710 of the feedstock liquefying unit 107. Alternatively, the first heat exchanging zone 712 and the second heat exchanging zone 713 may be configured and arranged to enable solidification of the AM feedstock material in the supply channel 710.

Furthermore, the person skilled in the art will appreciate that all heat exchanging zones 712, 713, 715, 716 are thermally insulated from each other and from the respective heat exchanging sections 711, 714 with which they are associated. In this way thermal crosstalk can be prevented.

The first exemplary, non-limiting embodiment of the connection arrangement 701 shown in FIG. 2A comprises a first connecting element 702 that is a first part of a screw thread connection and a second connecting element 703 that is a second part of the screw thread connection. The first part of the screw thread connection and the second part of the screw thread connection are configured and arranged to one of establish a releasable connection with each other upon rotatably assembling the connection arrangement 701 in order to releasably accommodate the feedstock liquefying unit 107 within the receiving space 205 after inserting the feedstock liquefying unit 107 therein, and to disconnect the releasable connection upon rotatably disassembling the connection arrangement 701 in order to remove the feedstock liquefying unit 107 from the receiving space 205. The person skilled in the art will appreciate that by establishing and disconnecting the releasable connection between the first connecting element 702 and the second connecting element 703 of the connection arrangement 701, exchange of the feedstock liquefying unit 107 in a direction parallel to an axial center line of the receiving space 205, i.e. in a Z-direction transverse to the X-Y plane, can be automated in an effective and simplified way. The person skilled in the art will appreciate that a used feedstock liquefying unit 107 can be replaced by a feedstock liquefying unit 107 stored within the feedstock liquefying unit storage 105, while keeping the heat exchanging means 106 in place, i.e. within the printhead assembly 102. This will be elucidated further in relation to FIGS. 7A-7F.

Figure 2B:
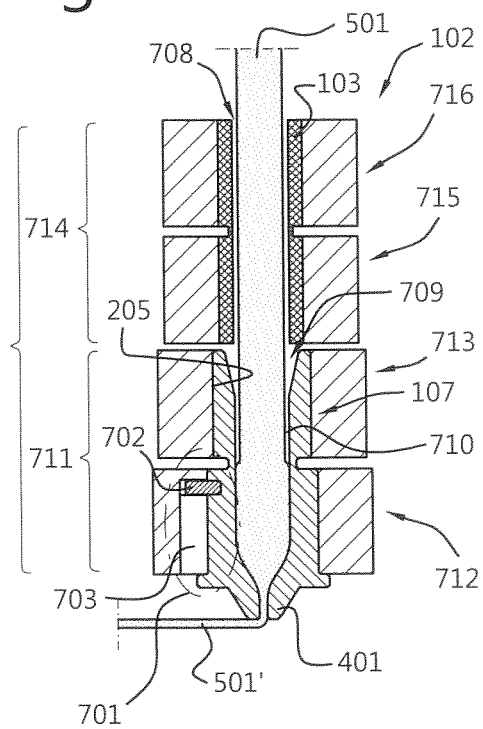
FIG. 2B shows a schematic longitudinal sectional view of a second exemplary, non-limiting embodiment of a connection arrangement of a printhead assembly of a system according to the invention.

FIG. 2B shows a schematic longitudinal sectional view of a second exemplary, non-limiting embodiment of a connection arrangement 701 of a printhead assembly 102 of a system 100 according to the invention. The connection arrangement 701 comprises a first connecting element 702 that is a first part of a bayonet connection and a second connecting element 703 that is a second part of the bayonet connection. The first part of the bayonet connection and the second part of the bayonet connection are configured and arranged to establish or disconnect a releasable connection with each other upon rotatably assembling or disassembling the connection arrangement 701 in an analogous way as described in relation to FIG. 2A. The person skilled in the art will appreciate that in this way an exchange of the feedstock liquefying unit 107 in a direction parallel to an axial center line of the receiving space 205, i.e. in a Z-direction transverse to the X-Y plane, can be automated in an effective and simplified way.

Figure 2C:
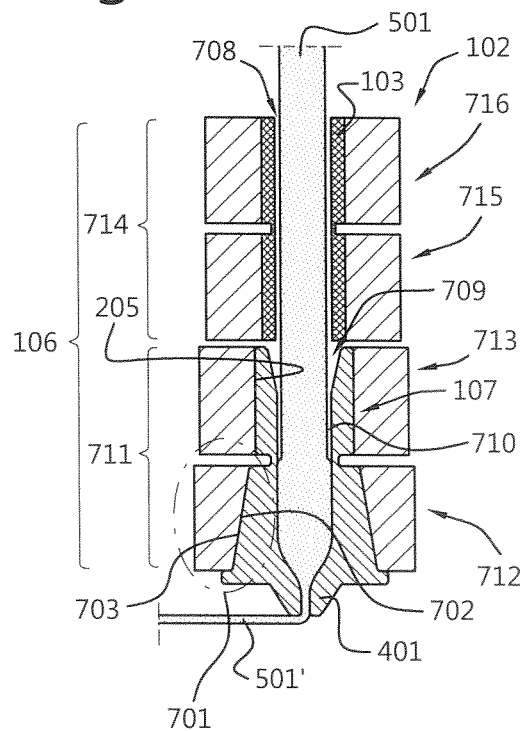
FIG. 2C shows a schematic longitudinal sectional view of a third exemplary, non-limiting embodiment of a connection arrangement of a printhead assembly of a system according to the invention.

FIG. 2C shows a schematic longitudinal sectional view of a third exemplary, non-limiting embodiment of a connection arrangement 701 of a printhead assembly 102 of a system 100 according to the invention. The connection arrangement 701 comprises a first connecting element 702 that is a first part of a machine taper connection and a second connecting element 703 that is a second part of the machine taper connection. The person skilled in the art will appreciate that the first part of the machine taper connection and the second part of the machine taper connection are configured and arranged to establish or disconnect a releasable connection with each other in order to assemble or disassemble the connection arrangement 701. The person skilled in the art will appreciate that by using the machine taper connection shown in FIG. 2C, an exchange of the feedstock liquefying unit 107 in a direction parallel to an axial center line of the receiving space 205, i.e. in a Z-direction transverse to the X-Y plane, can be automated in an effective and simplified way.

Figure 2D:
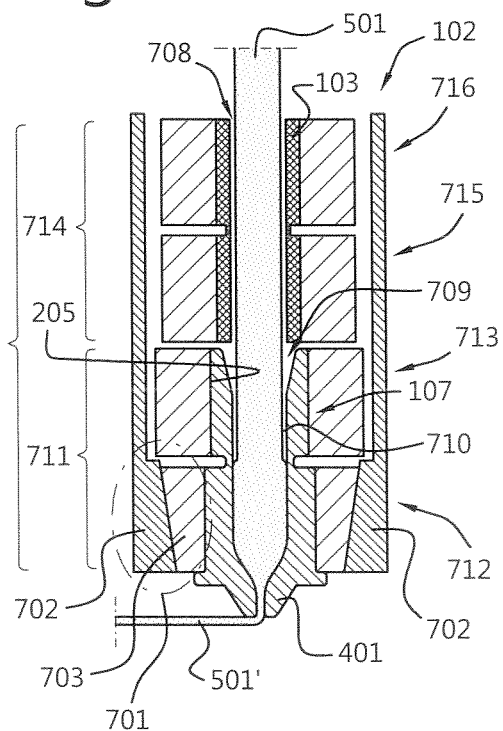
FIG. 2D shows a schematic longitudinal sectional view of a fourth exemplary, non-limiting embodiment of a connection arrangement of a printhead assembly of a system according to the invention.

FIG. 2D shows a schematic longitudinal sectional view of a fourth exemplary, non-limiting embodiment of a connection arrangement 701 of a printhead assembly 102 of a system 100 according to the invention. The connection arrangement 701 comprises a first connecting element 702 that is a first part of a kind of inverse collet connection and a second connecting element 703 that is a second part of said collet connection. The person skilled in the art will appreciate that the first part of the collet connection and the second part of the collet connection are configured and arranged to establish or disconnect a releasable connection with each other in order to assemble or disassemble the connection arrangement 701. The person skilled in the art will appreciate that by using the collet connection shown in FIG. 2D, an exchange of the feedstock liquefying unit 107 in a direction parallel to an axial center line of the receiving space 205, i.e. in a Z-direction transverse to the X-Y plane, can be automated in an effective and simplified way. Moreover, the person skilled in the art will appreciate that the third and the fourth exemplary, non-limiting embodiments of a connection arrangement 701 of a printhead assembly 102 of a system 100 according to the invention will enable a superior heat transfer between the heat exchanging means 106 and the feedstock liquefying unit 107.

Figure 3:
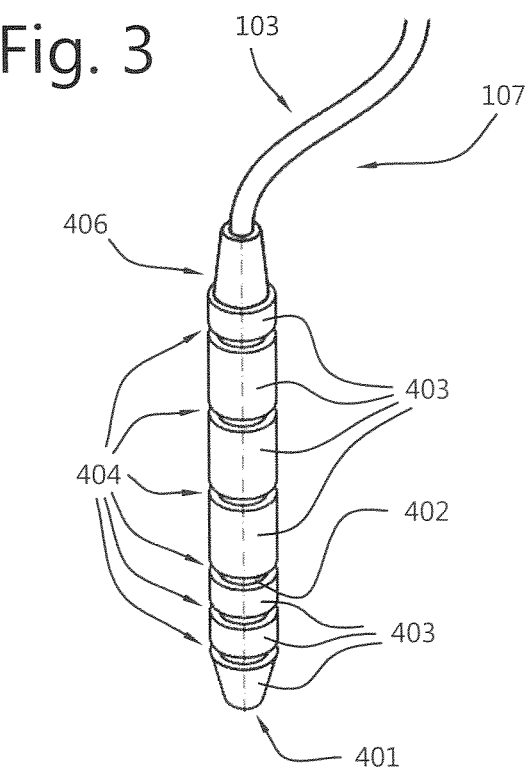
FIG. 3 shows a schematic isometric view of a first exemplary, non-limiting embodiment of a feedstock liquefying unit of a printhead assembly of a system according to the invention.

FIG. 3 shows a schematic isometric view of a first exemplary, non-limiting embodiment of a feedstock liquefying unit 107 of a printhead assembly 102 of a system 100 according to the invention. The feedstock liquefying unit 107 comprises a thermally conductive tube 402 that can comprise at least one of a metal, a thermally conductive polymer composition and a ceramic material. The thermally conductive tube 402 is provided with a supply channel 710 for AM feedstock material inside, a nozzle 401 for releasing molten feedstock material onto at least one of the build plate 104 and the 3D object 108 to be created. A feedstock supply 103, according to an exemplary embodiment thereof shown in FIG. 3, may be connected to the feedstock liquefying unit 107 by means of a cuff 406, opposite to the nozzle 401. The thermally conductive tube 402 may be provided with heat conductive sections 403. Each heat conductive section may be formed by a thickened portion of the thermally conductive tube 402. Alternatively each heat conductive section 403 comprises a concentric ring of highly heat conductive material such as a highly heat conductive metal.

Interface surfaces of the heat conductive sections 403 can mechanically and thermally interface with heat exchanging sections 711, 714. There can be multiple heat conductive sections 403 distributed along the thermally conductive tube 402 in an axial direction. The thermal interface surfaces of the heat conductive sections 403 are thermally conductive in radial and tangential direction relative to the thermal conductivity in axial direction, which is suppressed by grooves 404 that may serve as thermal insulators between individual heat conductive sections 403. In this way thermal crosstalk can be prevented. In addition, the grooves 404 may be used to interface the feedstock liquefying unit 107 with the feedstock liquefying unit storage 105.

The feedstock supply 103 may in this example be formed by a filament guide which guides AM feedstock material in the form of filament from a filament feedstock storage to the feedstock liquefying unit 107. The feedstock supply 103 may alternatively be arranged at or on the printhead 102. The feedstock supply 103 may be mounted for example to a sub frame (not shown). The feedstock supply 103 can in this case be releasably connected to the feedstock liquefying unit 107, to the opening of the supply channel at the end opposite of the nozzle 401. This allows the feedstock AM material to be supplied in different forms, such as filament, rods, granules, particles, or any form.

The feedstock supply 103 may comprise a drive, wherein the drive is connected to the printhead assembly 102, and wherein the feedstock supply 103 is connected to the printhead assembly via the drive. Preferably, the drive is located close to the feedstock liquefying unit 107, which overcomes a less dynamic response in the feedstock supply and thereby improves accurate control of the feeding of the feedstock material into the feedstock liquefying unit 107. Different feedstock liquefying units 107 can have different nozzle properties, such as exit opening diameters, materials, thermal properties and lengths, adapted for different AM feedstock materials. When switching between feedstock liquefying units with different AM feedstock materials, the temperature settings of each heat exchanging section may have to be adapted to the new AM feedstock. To minimize the exchange time of the feedstock liquefying unit, it is important to keep the thermal time constant low so that the heating up of the new feedstock liquefying unit can be done as fast as possible.

Figure 4:
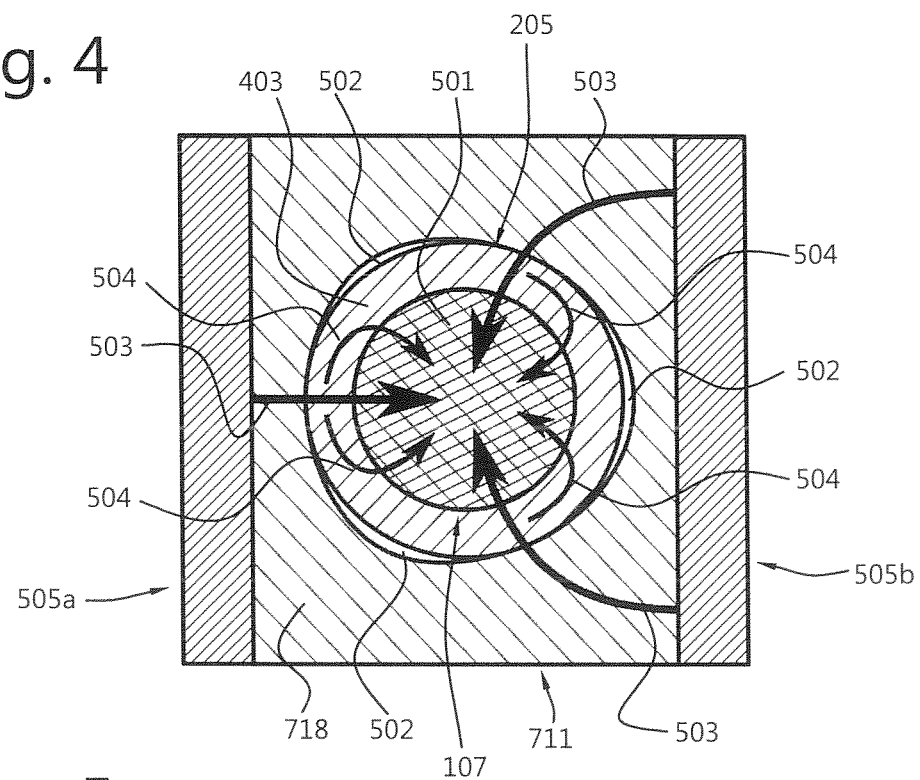
FIG. 4 shows a schematic cross-sectional view of a feedstock liquefying unit that is accommodated in a heat exchanging means according to an embodiment of the invention.

FIG. 4 shows a schematic cross-sectional view of a feedstock liquefying unit 107 that is accommodated in a heat exchanging means 106 according to an embodiment of the invention. The feedstock liquefying unit 107 is accommodated within receiving space 205 of heat conductive element 718 of the first heat exchanging section 711. In this exemplary embodiment, the heat conductive element 718 is provided with heaters 505a, 505b that are configured and arranged to generate the heat required for heating the feedstock liquefying unit 107 and the AM feedstock material 501 therein. The heaters 505a, 505b can be electrical resistors. Heat conductive element 718 is configured and arranged to conduct the heat generated in the heaters 505a, 505b to the feedstock liquefying unit 107. In this example, due to for example production tolerances and wear, a first section of the inner radius of heat conducting element 718 may be slightly larger than the outside radius of feedstock liquefying unit 107, while a second section of the inner radius of heat conductive element 718 may be slightly too small. As a consequence, air gaps 502 occur between the heat conductive element 718 and the feedstock liquefying unit 107.

Primary thermal paths 503 transfer the heat from the heat conductive element 718 to the feedstock liquefying unit 107 where there is physical contact between the inner surface of the heat conducting element 718 and the outer surface of the feedstock liquefying unit 107. Secondary thermal paths (not shown) may be defined by heat transfer via the air gaps 502. The primary thermal paths 503 however have better thermal conductivity than the secondary thermal paths through the airgaps 502 since heat resistance within the air gaps 502 is much greater than the heat resistance of the primary thermal paths 503.

The uneven distribution of heat from the heat conductive element 718 in this example may result in local hotspots in the feedstock material 501. This may have a negative effect on material properties of the 3D object 108 to be printed.

A remedy for this would be to design the feedstock liquefying unit 107 with sufficient tangential thermal conductivity. This can be accomplished by fabricating the feedstock liquefying unit 107 using a material with sufficient thermal conductivity and choosing a sufficient wall thickness. This can further be achieved by applying heat conductive section 403 that is configured and arranged to evenly redistribute heat transferred from the heat conductive element 718 across a circumference of the feedstock liquefying unit 107. Another remedy could be to employ induction heating to heat the feedstock liquefying unit 107, in a way as described in EP3237178 on page 3, lines 7-10, page 4, lines 1-5, page 4, lines 11-13, page 6, line 33-page 7, line 16 in relation to FIG. 1A, and page 8, line 17-page 9, line 3 in relation to FIGS. 3B and 4A.

Figure 5:
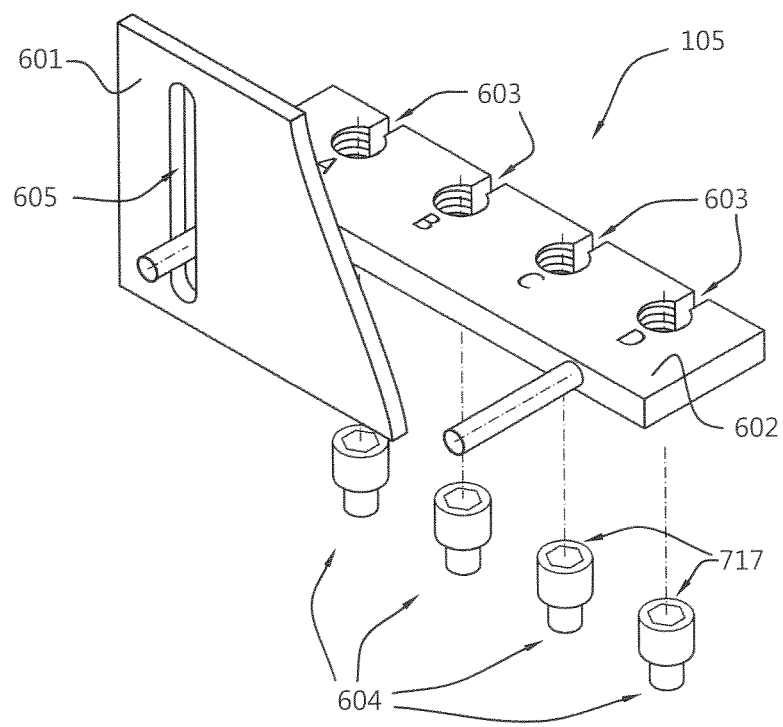
FIG. 5 shows a schematic isometric view of a first exemplary, non-limiting embodiment of a feedstock liquefying unit storage of a system according to the invention.

FIG. 5 shows a schematic isometric view of a first exemplary, non-limiting embodiment of a feedstock liquefying unit storage 105 of a system 100 according to the invention. The feedstock liquefying unit storage 105 comprises a holding means 602 in the form of a rack that is movably associated with a frame 601. The frame 601 can be formed by an inside wall of a print chamber of the system 100 in which the 3D object 108 is to be printed. The frame 601 is provided with a slit 605 that is configured and arranged to allow the rack 602 to be moved up and down relative to the frame 601. The rack 602 has slots 603 that are configured and arranged to allow interfacing with feedstock liquefying units 107, 107' as is elucidated further in relation to FIGS. 7A-7F. In this example, the rack 602 is provided with four slots 603 that are marked A to D. The person skilled in the art will appreciate that any number of slots can be provided and that they can be designated in any suitable way.

FIG. 5 further shows that below the four slots 603 of rack 602, four actuator means 604 are provided that are configured and arranged to interact with feedstock liquefying units in order to enable automatic exchange of the feedstock liquefying units, i.e. disposal of a used feedstock liquefying unit 107 in one of the slots A-D of rack 602 that are empty and/or acquisition of a replacement feedstock liquefying unit from any one of the remaining slots. The automatic exchange can be governed by a controller that is configured and arranged to control at least one of the positioning system 101 and the actuating means 604. The person skilled in the art will appreciate that the positioning system 101 and the actuating means 604 when disposing a used feedstock liquefying unit in the feedstock liquefying unit storage 105 will be actuated in reverse directions and in a reverse order than when acquiring a replacement feedstock liquefying unit from the feedstock liquefying unit storage 105. The person skilled in the art will appreciate that various alternative embodiments of the actuating means 604 can be envisaged. This will be described in further detail in relation to FIGS. 6A-6J. The person skilled in the art will also appreciate that the actuating means 604 in practice will not float in the air as for the sake of simplicity is illustrated for example in FIGS. 5, 7A-7F. They will be implemented in any suitable way to enable disposal and acquisition of a feedstock liquefying unit.

The feedstock liquefying unit storage 105 may be further provided with auxiliary holding means (not shown) such as clamps, notches and latches for securing the feedstock liquefying units 107 in the slots 603. The feedstock liquefying unit storage 105 may be further provided with temperature controlling means (not shown) such as heaters, coolers, sensors and regulators for controlling a temperature of one or more stored feedstock liquefying units. This allows a preheated replacement feedstock liquefying unit to be loaded into the heat exchanging means 106 of the printhead assembly 102 and be utilized instantly. The exchange of a used feedstock liquefying unit with a replacement feedstock liquefying unit will be further elucidated in relation to FIGS. 7A-7F.

Figure 6A:
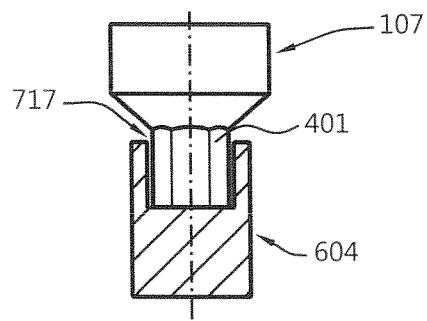
FIG. 6A shows a schematic longitudinal sectional view of a first exemplary, non-limiting embodiment of an actuating means that is arranged in contact with a first exemplary, non-limiting embodiment of a nozzle of a feedstock liquefying unit according to a first exemplary, non-limiting embodiment thereof.

FIG. 6A shows a schematic longitudinal sectional view of a first exemplary, non-limiting embodiment of an actuating means 604 that is arranged in contact with a first exemplary, non-limiting embodiment of a nozzle 401 of a feedstock liquefying unit 107 according to a first exemplary, non-limiting embodiment thereof. FIG. 6B shows a schematic cross-sectional view of the first exemplary, non-limiting embodiment of the actuating means 604 shown in FIG. 6A. In FIG. 6B it is shown that according to the first embodiment the actuating means 604 comprises an engagement arrangement 717 having a hexagonal shaped receiving space. The person skilled in the art will appreciate that any polygonal shape with any arbitrary number of sides can be used as long as the required torque can be achieved that is required to exchange the feedstock liquefying unit 107. In this exemplary embodiment the engagement arrangement 717 is configured and arranged to engage with the nozzle 401 of the feedstock liquefying unit 107 that is accommodated in the receiving space to enable exchange of the feedstock liquefying unit upon rotation of the actuating means 604 relative to the feedstock liquefying unit 107. In accordance with the first exemplary, non-limiting embodiment, the nozzle 401 has a hexagonally shaped outer circumference that enables it to snugly fit in the receiving space of the engagement arrangement 717.

Figure 6C:
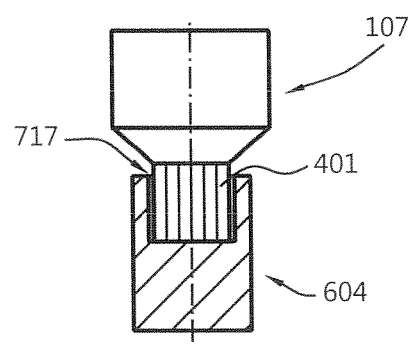
FIG. 6C shows a schematic longitudinal sectional view of a second exemplary, non-limiting embodiment of the actuating means that is arranged in contact with a second exemplary, non-limiting embodiment of the nozzle of the feedstock liquefying unit according to the first exemplary, non-limiting embodiment thereof.
Figure 6B:
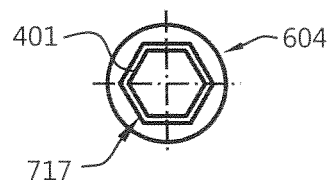
FIG. 6B shows a schematic cross-sectional view of the first exemplary, non-limiting embodiment of the actuating means shown in FIG. 6A.
Figure 6D:
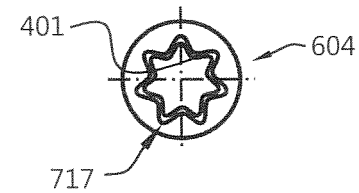
FIG. 6D shows a schematic cross-sectional view of the second exemplary, non-limiting embodiment of the actuating means shown in FIG. 6C.

FIG. 6C shows a schematic longitudinal sectional view of a second exemplary, non-limiting embodiment of the actuating means 604 that is arranged in contact with a second exemplary, non-limiting embodiment of the nozzle 401 of the feedstock liquefying unit 107 according to the first exemplary, non-limiting embodiment thereof. FIG. 6D shows a schematic cross-sectional view of the second exemplary, non-limiting embodiment of the actuating means 604 shown in FIG. 6C. In FIG. 6D it is shown that according to the second embodiment, the actuating means 604 comprises an engagement arrangement 717 having a star shaped receiving space. The person skilled in the art will appreciate that any star shape with any arbitrary number of sides can be used as long as the required torque can be achieved that is required to exchange the feedstock liquefying unit 107. In this exemplary embodiment the engagement arrangement 717 is configured and arranged to engage with the nozzle 401 of the feedstock liquefying unit 107 that is accommodated in the receiving space, to enable exchange of the feedstock liquefying unit upon rotation of the actuating means 604 relative to the feedstock liquefying unit 107. In accordance with the second exemplary, non-limiting embodiment, the nozzle 401 has a star shaped outer circumference that enables it to snugly fit in the receiving space of the engagement arrangement 717.

Figure 6E:
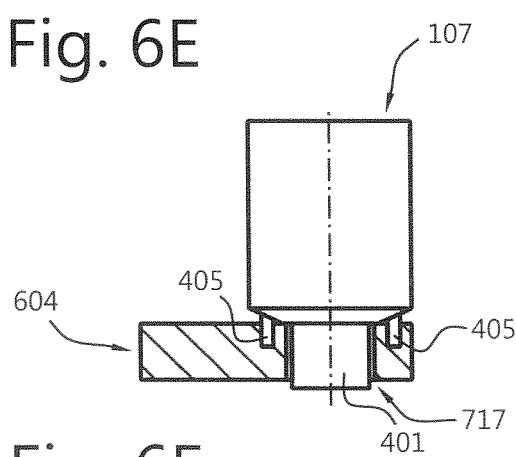
FIG. 6E shows a schematic longitudinal sectional view of a third exemplary, non-limiting embodiment of the actuating means that is arranged in contact with a third exemplary, non-limiting embodiment of the nozzle of the feedstock liquefying unit according to a second exemplary, non-limiting embodiment thereof.

FIG. 6E shows a schematic longitudinal sectional view of a third exemplary, non-limiting embodiment of the actuating means 604 that is arranged in contact with a third exemplary, non-limiting embodiment of the nozzle 401 of the feedstock liquefying unit 107 according to a second exemplary, non-limiting embodiment thereof. FIG. 6F shows a schematic cross-sectional view of the third exemplary, non-limiting embodiment of the actuating means 604 shown in FIG. 6E. In FIG. 6F it is shown that according to the third embodiment, the actuating means 604 is a wrench that comprises an engagement arrangement 717 that is provided with two recesses 606 that are configured and arranged to engage with two pins 405 of the feedstock liquefying unit 107 to enable exchange of the feedstock liquefying unit upon rotation of the actuating means 604 relative to the feedstock liquefying unit 107. The person skilled in the art will appreciate that any number of recesses and pins can be used as long as the required torque can be achieved that is required to exchange the feedstock liquefying unit 107. The two recesses 606 shown in FIGS. 6E and 6F are blind holes that are provided in the actuating means 604. The person skilled in the art will appreciate that depending on specific requirements the recesses 606 can also be through holes or a combination of blind holes and through holes. Furthermore, the recesses 606 shown in FIGS. 6E and 6F have an outer circumference having a circular cross-section. The person skilled in the art will appreciate that the recesses can have any other suitable cross-sectional shape for its outer circumference, e.g. rectangular, triangular, hexagonal, star shaped or any other polygonal shape.

Figure 6G:
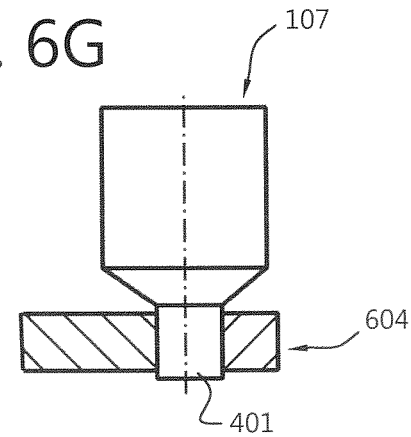
FIG. 6G shows a schematic longitudinal sectional view of a fourth exemplary, non-limiting embodiment of the actuating means that is arranged in contact with the third exemplary, non-limiting embodiment of the nozzle of the feedstock liquefying unit according to the first exemplary, non-limiting embodiment thereof.
Figure 6F:
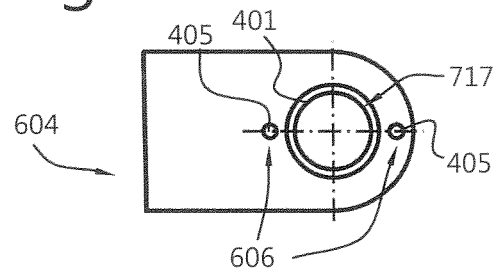
FIG. 6F shows a schematic cross-sectional view of the third exemplary, non-limiting embodiment of the actuating means shown in FIG. 6E.
Figure 6H:
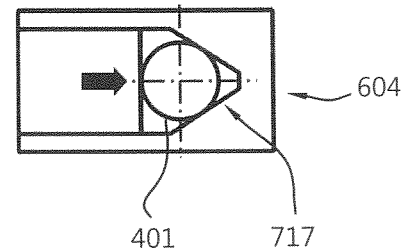
FIG. 6H shows a schematic cross-sectional view of the fourth exemplary, non-limiting embodiment of the actuating means shown in FIG. 6G.

FIG. 6G shows a schematic longitudinal sectional view of a fourth exemplary, non-limiting embodiment of the actuating means 604 that is arranged in contact with the third exemplary, non-limiting embodiment of the nozzle 401 of the feedstock liquefying unit 107 according to the first exemplary, non-limiting embodiment thereof. FIG. 6H shows a schematic cross-sectional view of the fourth exemplary, non-limiting embodiment of the actuating means 604 shown in FIG. 6G. In FIG. 6H it is shown that according to the fourth embodiment, the actuating means 604 comprises an engagement arrangement 717 that constitutes a clamp that is configured and arranged to frictionally enclose the outer circumference of the nozzle 401 to enable applying a torque to the nozzle 401 in order to exchange the feedstock liquefying unit 107 upon rotation of the actuating means 604 relative to the feedstock liquefying unit 107. The exerted torque is at least due to friction between the clamp and the nozzle 401 of the feedstock liquefying unit 107.

Figure 6I:
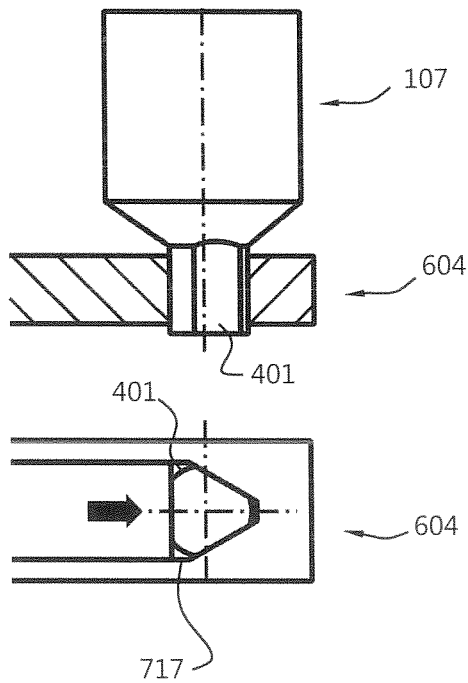
FIG. 6I shows a schematic longitudinal sectional view of a fifth exemplary, non-limiting embodiment of the actuating means that is arranged in contact with a fourth exemplary, non-limiting embodiment of the nozzle of the feedstock liquefying unit according to the first exemplary, non-limiting embodiment thereof.
Figure 6J:
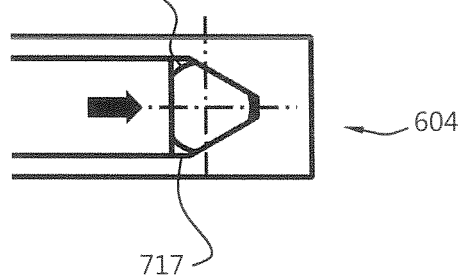
FIG. 6J shows a schematic cross-sectional view of the fifth exemplary, non-limiting embodiment of the actuating means shown in FIG. 6I.

FIG. 6I shows a schematic longitudinal sectional view of a fifth exemplary, non-limiting embodiment of the actuating means 604 that is arranged in contact with a fourth exemplary, non-limiting embodiment of the nozzle 401 of the feedstock liquefying unit 107 according to the first exemplary, non-limiting embodiment thereof. FIG. 6J shows a schematic cross-sectional view of the fifth exemplary, non-limiting embodiment of the actuating means 604 shown in FIG. 6I. In FIG. 6J it is shown that according to the fifth embodiment, the actuating means 604 comprises an engagement arrangement 717 that constitutes a clamp that is configured and arranged to form fittingly enclose the outer circumference of the nozzle 401 to enable applying a torque to the nozzle 401 in order to exchange the feedstock liquefying unit upon rotation of the actuating means 604 relative to the feedstock liquefying unit 107. The exerted torque is at least due to the interlocking or form fitting connection between the clamp and the nozzle 401 of the feedstock liquefying unit 107.

FIGS. 7A-7F schematically show an exemplary process for disposing a used feedstock liquefying unit 107 in a feedstock liquefying unit storage 105 according to the first exemplary, non-limiting embodiment thereof shown in FIG. 5 and acquiring a replacement feedstock liquefying unit 107' from the feedstock liquefying unit storage 105 using actuating means 604 according to a sixth exemplary, non-limiting embodiment thereof. It is noted that the example is described using Cartesian coordinates (X,Y,Z). It will be clear that different coordinate systems, e.g. spherical coordinates, can also be used.

Figure 7A:
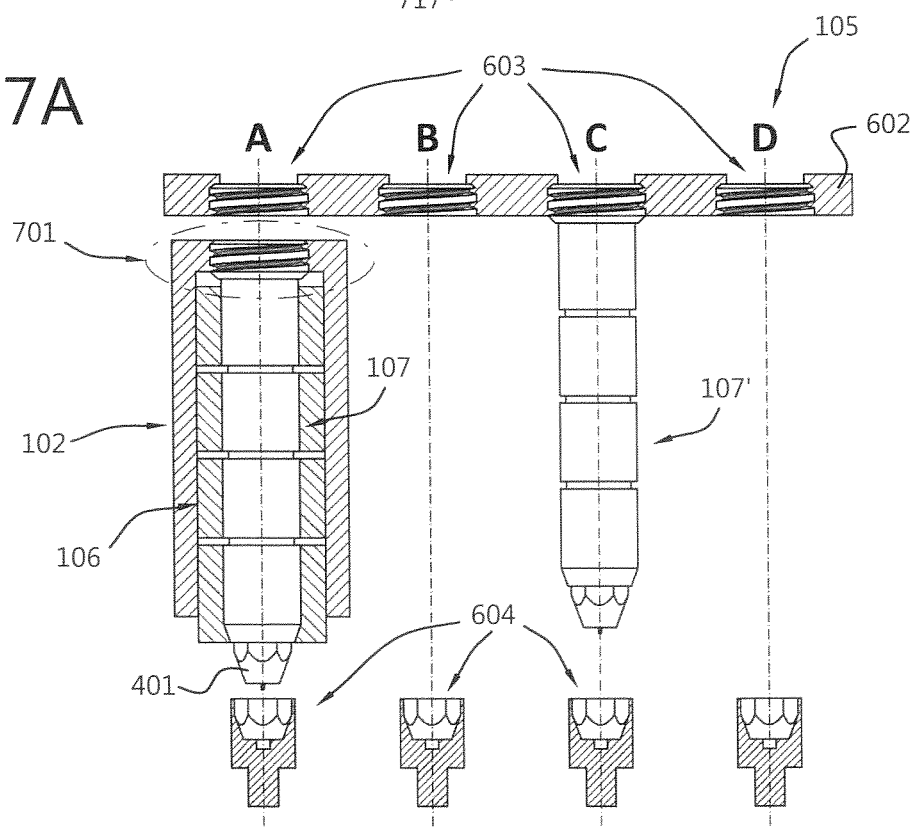

FIG. 7A schematically shows a situation in which after the printhead assembly 102 has stopped printing with feedstock liquefying unit 107, the positioning system (not shown) has moved the printhead assembly 102 to slot A of the, by way of example, four slots 603 of the holding means 602 of the feedstock liquefying unit storage 105. The respective axial center lines of the feedstock liquefying unit 107, slot A and the actuating means 604 that is positioned underneath slot A are all aligned. The person skilled in the art will appreciate that this is important for a proper disposal of the feedstock liquefying unit in slot A.

FIG. 7A also shows that, by way of example, slot C of the holding means 602 accommodates a replacement feedstock liquefying unit 107'. In another exemplary embodiment, at least one of the slots B and D of the holding means 602 could also accommodate a replacement feedstock liquefying unit. Furthermore, it is noted that the connection arrangement 701 is a screw thread connection as explained in relation to FIG. 2A. The person skilled in the art will appreciate that any other suitable connection arrangement such as a bayonet coupling (cfr. FIG. 2B), a machine taper connection (cfr. FIG. 2C) or a collet connection (cfr. FIG. 2D) can also be used.

FIG. 7B shows that the actuating means 604 that is located underneath slot A has been moved towards the holding means 602 in order to come into contact with the nozzle 401 of the feedstock liquefying unit 107 and is rotated to fasten the feedstock liquefying unit 107 in slot A. In this way the feedstock liquefying unit 107 is removed from the printhead assembly 102 and disposed in slot A of the holding means 602 of the feedstock liquefying unit storage 105. The person skilled in the art will appreciate that before being able to dispose the feedstock liquefying unit 107 in slot A, the connection arrangement 701 had to be disassembled. This was achieved by moving the actuating means 604 that is located underneath slot A towards the holding means 602 in order to come into contact with the nozzle 401 of the feedstock liquefying unit 107 and by rotating it to disassemble the screw thread connection in order to remove the feedstock liquefying unit 107 from the receiving space 205 of the heat exchanging means 106. Upon disassembling the screw thread connection, this could be done by moving the actuating means 604 further towards the holding means 602. In this way the feedstock liquefying unit 107 is partially pushed out of the receiving space 205 towards slot A. Subsequently, the feedstock liquefying unit 107 is fastened in slot A as described above.

FIG. 7C shows that the feedstock liquefying unit 107 is removed completely out of the receiving space 205 of the heat exchanging means 106 by moving the holding means 602 away from the actuating means 604 (as indicated by the big arrow). This completes the disposal of the feedstock liquefying unit 107 in slot A.

Figure 7D:
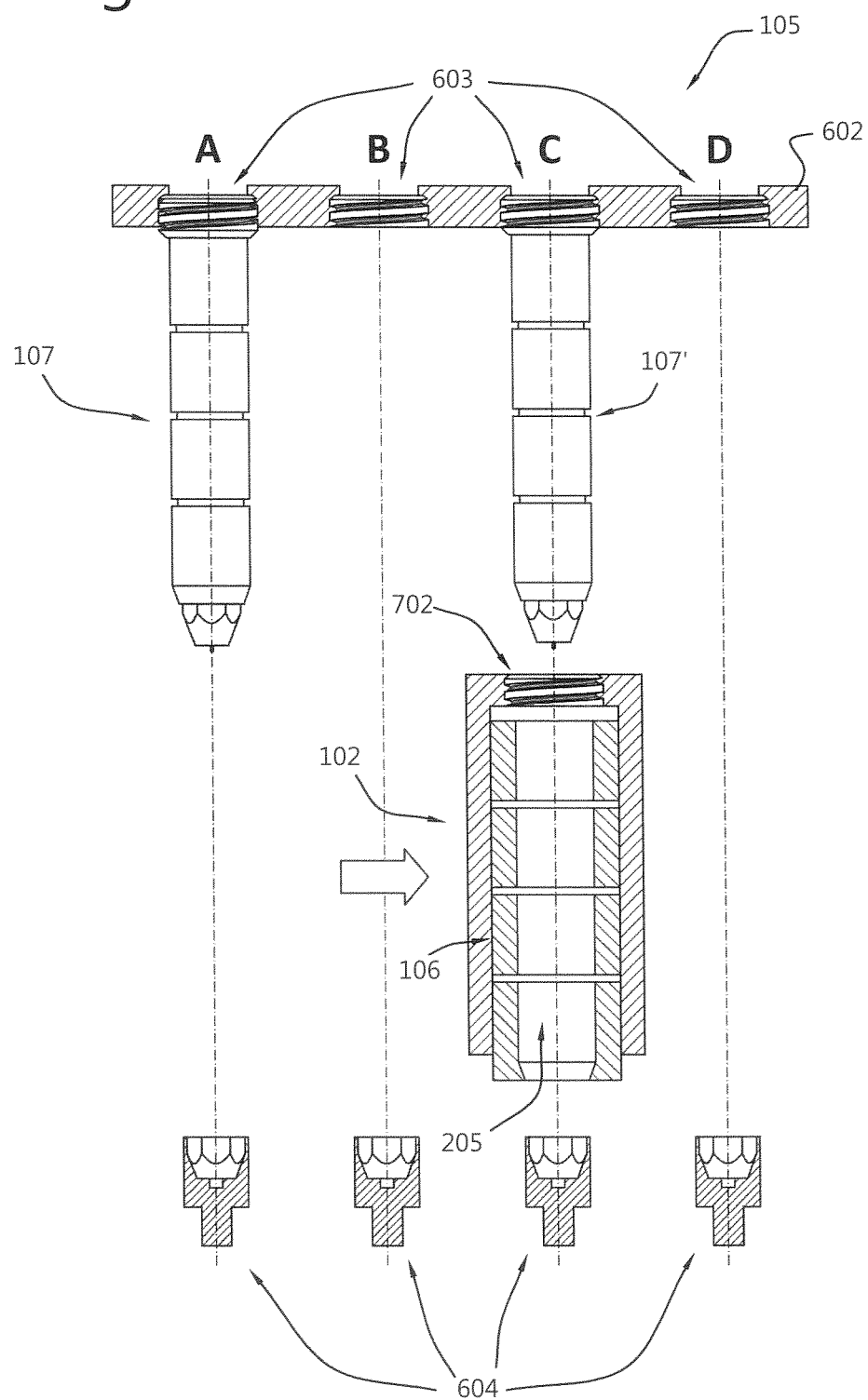

FIG. 7D shows that the printhead assembly 102 has been positioned underneath slot C after having been moved by the positioning system (not shown) in a direction parallel to the holding means 602 as indicated by the big arrow. The respective axial center lines of the replacement feedstock liquefying unit 107', slot C and the actuating means 604 that is positioned underneath slot C are all aligned. The person skilled in the art will appreciate that this is important for a proper acquisition of the replacement feedstock liquefying unit 107' in the receiving space 205 of the heat exchanging means 106.

Figure 7E:
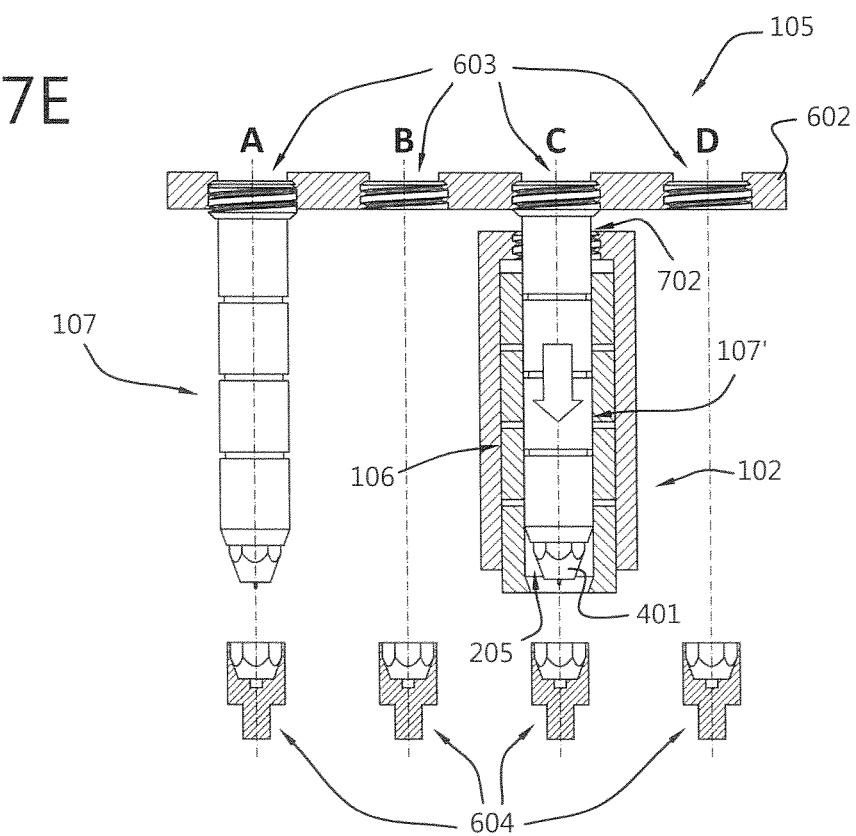

FIG. 7E shows the acquisition of the replacement feedstock liquefying unit 107' by the printhead assembly 102. By moving the holding means 602 towards the actuating means 604 as indicated by the big arrow, the replacement feedstock liquefying unit 107' is moved inside the receiving space 205 of the heat exchanging means 106.

Figure 7F:
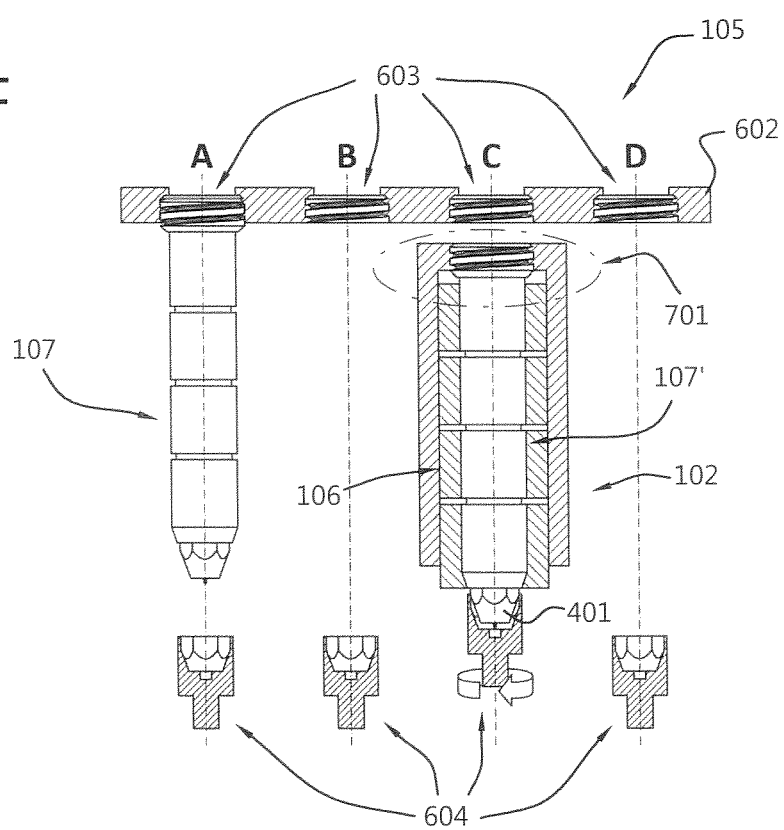

FIG. 7F shows that the actuating means 604 that is located underneath slot C has been moved towards the holding means 602 in order to come into contact with the nozzle 401 of the replacement feedstock liquefying unit 107' and is rotated to assemble the connection arrangement 701 that fastens the replacement feedstock liquefying unit 107' to the printhead assembly 102. In this way the replacement feedstock liquefying unit 107' has been acquired from slot C of the holding means 602 of the feedstock liquefying unit storage 105. The person skilled in the art will appreciate that before being able to acquire the replacement feedstock liquefying unit 107' from slot C, the connection between the replacement feedstock liquefying unit 107' and slot C had to be disassembled. This was achieved by moving the actuating means 604 that is located underneath slot C towards the holding means 602 in order to come into contact with the nozzle 401 of the replacement feedstock liquefying unit 107' and by rotating it to disassemble the screw thread connection in order to remove the replacement feedstock liquefying unit 107' from slot C and insert it into the receiving space 205 of the heat exchanging means 106. Upon disassembling the screw thread connection, the latter can be done by moving the actuating means 604 away from the holding means 602. In this way the replacement feedstock liquefying unit 107' is inserted into the receiving space 205 of the heat exchanging means 106. It is clear that after insertion of the replacement feedstock liquefying unit 107' into the receiving space 205, replacement feedstock liquefying unit 107' is fastened to the printhead assembly 102 by assembling the connection arrangement 701 as described above.

A person skilled in the art will understand that the relative movements between the feedstock liquefying unit storage 105, the heat exchanging means 106 and the feedstock liquefying unit 107, 107' can also be achieved by moving the heat exchanging means 106 in the axial direction. Other configurations are also possible.

The present invention can be summarized as relating to a system 100 for additive manufacturing, comprising at least one printhead assembly 102 that comprises a feedstock liquefying unit 107 for liquefying and depositing feedstock material 501 via a nozzle 401, heat exchanging means 106 attached to the printhead assembly being provided with a receiving space 205 that is configured and arranged to receive the feedstock liquefying unit, and a connection arrangement 701 that comprises a first connecting element 702 and a second connecting element 703 that are configured and arranged to one of establish a releasable connection with each other and disconnect said releasable connection upon rotating the first and second connecting elements with respect to each other. The system further comprises a feedstock liquefying unit storage 105, comprising an actuating means 604 that enables assembling and disassembling the connecting arrangement to automatically exchange the feedstock liquefying unit, and a controller for controlling automatic exchange of the feedstock liquefying unit.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS

| | |
|---|---|
| 100 | System for additive manufacturing |
| 101 | Positioning system |
| 102 | Printhead assembly |
| 103 | Feedstock supply |
| 104 | Build plate |
| 105 | Feedstock liquefying unit storage |
| 106 | Heat exchanging means |
| 107 | Feedstock liquefying unit |
| 108 | Object to be printed |
| 205 | Receiving space of the heat exchanging means |
| 401 | Nozzle |
| 402 | Thermally conductive tube |
| 403 | Heat conductive section |
| 404 | Groove |
| 405 | Pins |
| 406 | Cuff |
| 501 | AM feedstock material |
| 502 | Air gap |
| 503 | Primary thermal path |
| 504 | Heat distribution |
| 505a, 505b | Heaters |
| 601 | Frame |
| 602 | Holding means |
| 603 | Slots of rack |
| 604 | Actuating means |
| 605 | Slit in frame |
| 606 | Recess |
| 701 | Connection arrangement |
| 702 | First connecting element |
| 703 | Second connecting element |
| 708 | Feed channel |
| 709 | Receiving opening of the feedstock liquefying unit |
| 710 | Supply channel |
| 711 | First heat exchanging section |
| 712 | First heat exchanging zone |
| 713 | Second heat exchanging zone |
| 714 | Second heat exchanging section |
| 715 | Third heat exchanging zone |
| 716 | Fourth heat exchanging zone |
| 717 | Engagement arrangement of actuating means |
| 718 | Heat conductive element |

What is claimed is:

1. A system for additive manufacturing (AM), comprising:
   a build plate for positioning a three-dimensional (3D) object to be fabricated;
   at least one printhead assembly for fused deposition modeling, wherein the printhead assembly comprises:
      connection means that is configured and arranged to connect the printhead assembly to a positioning system;
      a feedstock liquefying unit for liquefying AM feedstock material, comprising a nozzle for depositing the liquefied AM feedstock material onto at least one of the build plate and the 3D object to be fabricated;
      heat exchanging means that is attached to the printhead assembly and that is provided with a receiving space that is configured and arranged to receive and accommodate the feedstock liquefying unit to allow heat exchange between the heat exchanging means and the feedstock liquefying unit; and
      a connection arrangement that comprises a first connecting element and a second connection element that are configured and arranged to one of:
         establish a releasable connection with each other upon assembling the connection arrangement to releasably accommodate the feedstock liquefying unit within the receiving space after inserting the feedstock liquefying unit therein; and
         disconnect said releasable connection upon disassembling the connection arrangement to remove the feedstock liquefying unit from the receiving space;
   feedstock supply means that is configured and arranged to feed the AM feedstock material into the feedstock liquefying unit;
   a positioning system associated with at least one of the printhead assembly and the build plate, that is configured and arranged to spatially position the printhead assembly and the build plate relative with respect to each other;
   a feedstock liquefying unit storage, comprising an actuating means that is configured and arranged to enable assembling and disassembling the connecting arrangement to automatically exchange the feedstock liquefying unit; and
   a controller that is configured and arranged to control at least one of the positioning system and the actuating means to one of automatically dispose a used feedstock liquefying unit in the feedstock liquefying unit storage and automatically acquire a replacement feedstock liquefying unit from the feedstock liquefying unit storage.

2. The system according to claim 1, wherein the connection arrangement is configured and arranged to establish the releasable connection between the first connecting element and the second connecting element in one of a force fitting way and a form fitting way.

3. The system according to claim 1, wherein the connection arrangement is configured and arranged to one of:
   establish the releasable connection between the first connecting element and the second connecting element upon rotatably assembling the connection arrangement; and
   disconnect the releasable connection between the first connecting element and the second connecting element upon rotatably disassembling the connection arrangement.

4. The system according to claim 1, wherein the first connecting element and the second connecting element are respectively a first part and a second part of one of a screw thread connection, a bayonet connection, a machine taper connection and a collet connection.

5. The system according to claim 1, wherein the feedstock supply means comprises a feed channel that is configured and arranged to accommodate and feed the AM feedstock material towards the feedstock liquefying unit that is provided with a receiving opening that is configured and arranged to receive the AM feedstock material from the feed channel and guide the feedstock material into a supply channel of the feedstock liquefying unit that is configured and arranged to supply the AM feedstock material from the receiving opening to the nozzle.

6. The system according to claim 5, wherein the heat exchanging means comprises a first heat exchanging section that comprises a first heat exchanging zone, the first heat exchanging section being configured and arranged to at least partially enclose the receiving space that is configured and arranged to at least partially accommodate the supply channel of the feedstock liquefying unit, the first heat exchanging zone being configured and arranged to liquefy the AM feedstock material that is accommodated in the supply channel.

7. The system according to claim 6, wherein the first heat exchanging section comprises a second heat exchanging zone that is configured and arranged to maintain a boundary between solid AM feedstock material and liquefied AM feedstock material at a predetermined fixed position in the supply channel of the feedstock liquefying unit.

8. The system according to claim 6, wherein the heat exchanging means comprises a second heat exchanging section that comprises a third heat exchanging zone, the second heat exchanging section being configured and arranged to at least partially accommodate the feed channel of the feedstock supply means and the third heat exchanging zone being configured and arranged to pre-heat the AM feedstock material that is accommodated in the feed channel.

9. The system according to any one of the preceding claims claim 1, wherein the feedstock liquefying unit storage comprises holding means that is provided with at least one of:
at least one unoccupied docking position (A) that is configured and arranged to receive and accommodate a used feedstock liquefying unit; and
at least one occupied docking position (C) that is configured and arranged to accommodate a replacement feedstock liquefying unit.

10. The system according to claim 9, wherein the controller is configured to:
control the positioning system for moving the printhead assembly to the at least one unoccupied docking position (A) of the holding means;
enable engagement of the holding means and the used feedstock liquefying unit;
enable engagement of the actuating means with at least one of the connection arrangement, the feedstock liquefying unit and the heat exchanging means to disassemble the connection arrangement; and
dispose the used feedstock liquefying unit in the at least one unoccupied docking position (A) of the holding means.

11. The system according to claim 9, wherein the controller is configured to:
control the positioning system for moving the printhead to the at least one occupied docking position (C) of the holding means that is provided with a replacement feedstock liquefying unit;
enable engagement of the replacement feedstock liquefying unit with the heat exchanging means;
enable engagement of the actuating means with at least one of the connection arrangement, the feedstock liquefying unit and the heat exchanging means to assemble the connection arrangement and accommodate the replacement feedstock liquefying unit within the receiving space of the heat exchanging means; and
control the positioning system for retracting the printhead from the at least one occupied docking position (C) of the holding means.

12. The system according to claim 1, wherein the actuating means comprises an engagement arrangement that is configured and arranged to engage with at least one of the connection arrangement, the feedstock liquefying unit and the heat exchanging means in one of a form fitted way and a force fitted way to enable one of assembling and disassembling of the connecting arrangement to automatically exchange the feedstock liquefying unit.

13. The system according to claim 1, wherein the connection arrangement is configured and arranged to enable release and acquisition of the feedstock liquefying unit in a direction parallel to an axial center line of the receiving space.

14. The system according to claim 6, wherein the feedstock liquefying unit comprises a thermally conductive tube attached to the nozzle, wherein the supply channel is accommodated within the thermally conductive tube, and the receiving opening is formed by an end part of the thermally conductive tube that is arranged opposite the nozzle.

15. The system according to claim 14, wherein the thermally conductive tube is provided with at least one concentric heat conductive section, and wherein at least the first heat exchanging section is provided with at least one heat conductive element that is configured and arranged to accommodate the at least one concentric heat conductive section for close fittingly accommodating the feedstock liquefying unit inside at least the first heat exchanging section.

16. The system according to claim 2, wherein the connection arrangement is configured and arranged to one of:
establish the releasable connection between the first connecting element and the second connecting element upon rotatably assembling the connection arrangement; and
disconnect the releasable connection between the first connecting element and the second connecting element upon rotatably disassembling the connection arrangement, and wherein the first connecting element and the second connecting element are respectively a first part and a second part of one of a screw thread connection, a bayonet connection, a machine taper connection and a collet connection.

17. The system according to claim 16, wherein the feedstock supply means comprises a feed channel that is configured and arranged to accommodate and feed the AM feedstock material towards the feedstock liquefying unit that is provided with a receiving opening that is configured and arranged to receive the AM feedstock material from the feed channel and guide the feedstock material into a supply channel of the feedstock liquefying unit that is configured and arranged to supply the AM feedstock material from the receiving opening to the nozzle,
wherein the heat exchanging means comprises a first heat exchanging section that comprises a first heat exchanging zone, the first heat exchanging section being configured and arranged to at least partially enclose the receiving space that is configured and arranged to at least partially accommodate the supply channel of the feedstock liquefying unit, the first heat exchanging zone being configured and arranged to liquefy the AM feedstock material that is accommodated in the supply channel, and
wherein the first heat exchanging section comprises a second heat exchanging zone that is configured and arranged to maintain a boundary between solid AM feedstock material and liquefied AM feedstock material at a predetermined fixed position in the supply channel of the feedstock liquefying unit.

18. The system according to claim 17, wherein the heat exchanging means comprises a second heat exchanging section that comprises a third heat exchanging zone, the second heat exchanging section being configured and arranged to at least partially accommodate the feed channel of the feedstock supply means and the third heat exchanging zone being configured and arranged to pre-heat the AM feedstock material that is accommodated in the feed channel,
wherein the feedstock liquefying unit storage comprises holding means that is provided with at least one of:
at least one unoccupied docking position (A) that is configured and arranged to receive and accommodate a used feedstock liquefying unit; and
at least one occupied docking position (C) that is configured and arranged to accommodate a replacement feedstock liquefying unit, and
wherein the controller is configured to:
control the positioning system for moving the printhead assembly to the at least one unoccupied docking position (A) of the holding means;
enable engagement of the holding means and the used feedstock liquefying unit;
enable engagement of the actuating means with at least one of the connection arrangement, the feedstock liquefying unit and the heat exchanging means to disassemble the connection arrangement; and dispose the used feedstock liquefying unit in the at least one unoccupied docking position (A) of the holding means.

19. The system according to claim 18, wherein the controller is configured to:
control the positioning system for moving the printhead to the at least one occupied docking position (C) of the holding means that is provided with a replacement feedstock liquefying unit;
enable engagement of the replacement feedstock liquefying unit with the heat exchanging means;
enable engagement of the actuating means with at least one of the connection arrangement, the feedstock liquefying unit and the heat exchanging means to assemble the connection arrangement and accommodate the replacement feedstock liquefying unit within the receiving space of the heat exchanging means; and
control the positioning system for retracting the printhead from the at least one occupied docking position (C) of the holding means, and
wherein the actuating means comprises an engagement arrangement that is configured and arranged to engage with at least one of the connection arrangement, the feedstock liquefying unit and the heat exchanging means in one of a form fitted way and a force fitted way to enable one of assembling and disassembling of the connection arrangement to automatically exchange the feedstock liquefying unit.

20. The system according to claim 19, wherein the connection arrangement is configured and arranged to enable release and acquisition of the feedstock liquefying unit in a direction parallel to an axial center line of the receiving space,
wherein the feedstock liquefying unit comprises a thermally conductive tube attached to the nozzle, wherein the supply channel is accommodated within the thermally conductive tube, and the receiving opening is formed by an end part of the thermally conductive tube that is arranged opposite the nozzle, and
wherein the thermally conductive tube is provided with at least one concentric heat conductive section, and wherein at least the first heat exchanging section is provided with at least one heat conductive element that is configured and arranged to accommodate the at least one concentric heat conductive section for close fittingly accommodating the feedstock liquefying unit inside at least the first heat exchanging section.

\* \* \* \* \*